United States Patent [19]

Batla et al.

[11] Patent Number: 4,623,758
[45] Date of Patent: Nov. 18, 1986

[54] HYBRID SYSTEM FOR RECORDING VOICE AND DATA SIGNALS

[75] Inventors: Masroor A. Batla, Buena Park; Bradford E. Hanscom, Downey, both of Calif.

[73] Assignee: Fortel, Inc., Compton, Calif.

[21] Appl. No.: 722,349

[22] Filed: Apr. 12, 1985

[51] Int. Cl.$^4$ .................... H04M 11/00; H04M 1/65
[52] U.S. Cl. ........................................ 379/80; 379/81; 379/98
[58] Field of Search .................. 179/2 A, 2 DP, 6.07, 179/6.13, 6.14, 6.15; 375/5; 381/56, 110

[56] References Cited

U.S. PATENT DOCUMENTS

| | | | |
|---|---|---|---|
| 3,838,219 | 9/1974 | Mason | 179/2 DP |
| 4,160,125 | 7/1979 | Bower et al. | 179/6.02 |
| 4,469,919 | 9/1984 | Nakamura et al. | 179/6.07 X |
| 4,503,288 | 3/1985 | Kessler | 179/2 DP |
| 4,524,244 | 6/1985 | Faggin et al. | 179/2 DP |

Primary Examiner—Keith E. George
Attorney, Agent, or Firm—Keith D. Beecher

[57] ABSTRACT

Recording apparatus which may be in the form of a telephone answering machine which responds to ring signals received over a telephone line to answer a call and proceed through its normal answer sequence. A modem is connected to the apparatus, and if at any time during the answer sequence a data signal carrier is detected by the modem indicating the presence of data signals, a control signal is introduced to the apparatus to disable the internal VOX circuitry which does not respond to data signals, so as to enable the apparatus to continue to record the data signals for so long as the data signal carrier is detected. When the data signal carrier is no longer detected, the apparatus switches back to its normal mode.

4 Claims, 1 Drawing Figure

HYBRID SYSTEM FOR RECORDING VOICE AND DATA SIGNALS

BACKGROUND OF THE INVENTION

In accordance with present-day practice, data signals are transmitted over the telephone line modulated on a carrier. A modem is located at the receiving station which demodulates the data signals and introduces them to a computer. Such modulated data signals may be received and recorded by appropriate recording apparatus, such as a present-day telephone answering machine, for subsequent demodulation by an appropriate modem for computer use. However, problems arise in the present-day telephone answering machines in that the internal VOX circuits, which maintain the machine activated so long as a calling party continues to speak, do present-day telephone answering machines hang up in the presence of data signals.

Accordingly, an objective of the present invention is to provide appropriate apparatus which is capable of recording both voice and data signals without any tendency to hang up when the data signals are received. This is advantageous in that only one telephone line is required and a single apparatus may be used for recording both voice and data signals. With the apparatus of the present invention, both data and voice signals may be intermixed during the same call, with the apparatus being effective to record both the voice and the data signals.

DETAILED DESCRIPTION OF THE ILLUSTRATED EMBODIMENT

Figure 1:
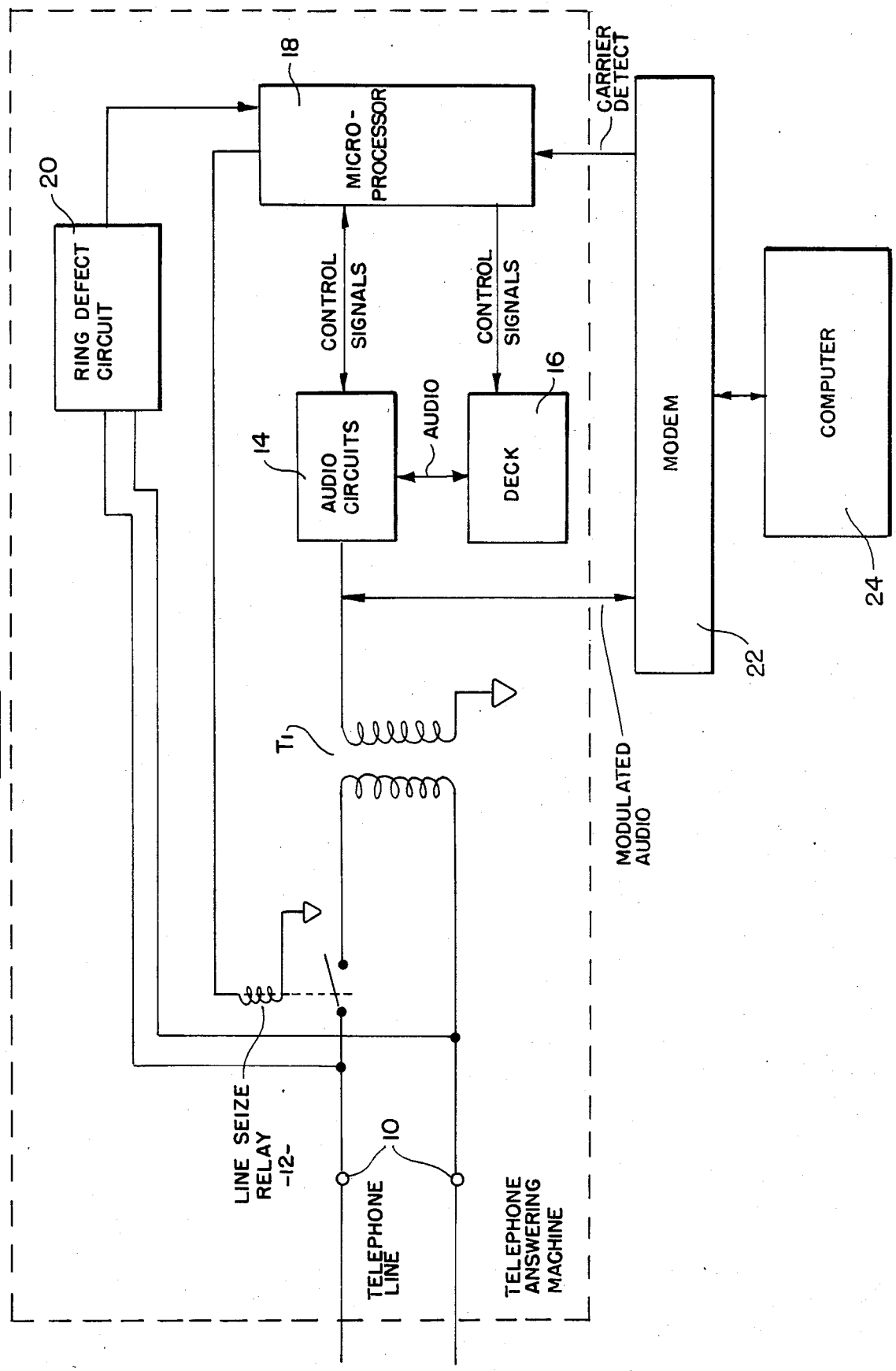
FIG. 1 is a block diagram of a telephone answering machine which is adapted to record both data and voice signals received over the telephone line.

The circuit of FIG. 1 includes a pair of input terminals 10 which may be connected to the tip and ring terminals of a telephone line. Terminals 10 are connected through the contacts of a line seize relay 12 to the primary of a transformer T1.

The secondary of the transformer is connected to a block 14 designated "AUDIO CIRCUITS" in which the audio signals received over the telephone line are processed and introduced to a deck 16, in which the audio signals are recorded on appropriate magnetic tapes.

The telephone answering machine of FIG. 1 is controlled by a microprocessor 18. The microprocessor responds to a control signal from a ring detect circuit 20, indicating that a call has been received on the telephone line, to introduce control signals to the audio circuits 14. These control signals cause the audio circuits to respond to audio signals received from an announcement tape in deck 16, and to transmit the audio signals to the calling party. These audio signals are usually in the form of an announcement, instructing the calling party to leave an appropriate message.

Before the audio signals may be received, the microprocessor activates the line seize relay 12, to enable the machine to seize the telephone line.

After the announcement has been sent out over the telephone line, the microprocessor transmits control signals to deck 16 to activate an appropriate recording tape mechanism. The audio circuits 14 are then controlled by the microprocessor to process the incoming audio signals corresponding to a message from the calling party, and cause the audio signals to be recorded on the message tape in deck 16.

The audio circuits 14 include a VOX circuit which is active during the message recording mode, and which permits an incoming message to be recorded so long as the calling party continues to speak. However, when the calling party stops speaking for approximately seven seconds, the VOX circuit automatically returns the apparatus to its stand-by mode.

The objective of the present invention is to adapt the system described above for recording data signals, which are received over the telephone line on an appropriate carrier. A problem arises, because the VOX circuit in the apparatus does not respond to the data signals to maintain the apparatus in an active state.

In the system shown in FIG. 1, when data signals are received over the telephone line modulated on an appropriate carrier, the modulated data signals are applied to a modem 22 which, during normal operation, demodulates the data signals and applies them to a computer 24 for utilization by the computer.

The modem 22 also detects the carrier on which the data signals are modulated, and introduces a carrier detect signal to microprocessor 18.

So long as the carrier detect signal continues, the microprocessor 18 causes its VOX program to be disabled, so that the incoming modulated data signals may be recorded on the message recording mechanism in deck 16. However, whenever the carrier detect signal is terminated, indicating that the data signals are no longer being received, the microprocessor 18 causes the telephone answering machine to return to its normal operational state.

Accordingly, the apparatus shown in FIG. 1 is capable of answering telephones, and of recording voice messages, in a manner known to the art. However, when modulated data signals are received, the apparatus is also capable of recording the data signals, by virtue of the fact that the carrier detect signal from modem 22 disables the VOX circuitry.

In the system shown in FIG. 1, modem 22 is connected to the telephone line in parallel with the telephone answering machine, and the audio signals received over the telephone line are applied both to the modem and to the answering machine. The microprocessor 18, on detecting an incoming ring signal will answer the call by energizing the line seize relay 12, and it will then play the outgoing announcement and subsequently proceed to the normal message record mode. If the received call is a normal voice message, then the machine records it on the message tape, and then resets itself after the caller has hung up. However, if someone is trying to leave a "data" message in addition to the voice message, or just a data message, then the carrier is detected by the modem 22 which then outputs a carrier detect signal to microprocessor 18. The microprocessor on receiving the detect signal will then disable any VOX hardware or software and continue recording on the message tape.

As explained above, the VOX software must be disabled because, due to the repetive nature of the data signal, the VOX is not effective to maintain the apparatus activated.

Besides being recorded on the tape, the data signals are demodulated in the modem 22 and applied to computer 24 to be displayed on the monitor of the computer.

When the data transmission ends, the modem 22 will detect the absence of the carrier signal on the telephone line and will change the logic level of the carrier detect signal applied to the microprocessor 18. The machine will then switch back to its normal message record mode with VOX enabled. The caller now has four options: he may either hang up; leave a voice message and then hang up; leave a voice message and start the next data transmission; or start the next data transmission.

For the first two options, the apparatus will detect the absence of voice after the caller hangs up. It will then drop the line seize relay 12 after approximately seven seconds, rewind the outgoing announcement tape and reset itself for the next call.

For the latter two options, the apparatus will go back into its record mode with VOX, and will record the data signals with VOX disabled, as soon as the carrier is again detected.

The data recorded in the apparatus can now be stored or played back to the computer 24 by way of modem 22. To play back to computer 24, the user simply rewinds the message tape and puts the machine in its playback mode. The voice and data signals recorded on the message tape will then be played back both to the speaker of the telephone answering machine and to the modem 22. The line seize relay 12 is now open, so that no signal is fed to the telephone line. The user now hears the voice message recorded on the message tape through the speaker, and when the machine starts playing back data signals the modem will then detect the carrier signal and output the carrier detect signal to the microprocessor which will then mute the speaker. The modem will demodulate the data signals from the message tape, and pass them to the computer for further processing, such as display on monitor, store on disk, etc.

The user can also call in and remote control the telephone answering machine. In this case his voice and data messages will be played back over the telephone line. If the user is connected to a modem and a computer at the other end, he can display the data on the monitor, store it on a disk, or accomplish any other processing that may be desired.

Some of the hardware and software modifications which may be made to the system are as follows:

1. A control switch to play back over the telephone line without having to remotely control the machine. This may be accomplished by energizing the line seize relay during playback.

2. A control button to disable recording on the tape so that the system may act as a regular answer only modem.

3. A control signal going to the relay to dial a number so that the system acts as an auto dial modem.

4. A control button to disable output to the computer 24 while data is being recorded on the tape.

5. A demodulated data path back to the microprocessor in the machine, so that data may be processed by the microprocessor 18 into a hardware/software control signal for the machine. Such a signal could be used for changing the setting of the machine, such as ring, VOX, etc., or other device which may control lights, appliances and the like.

6. An indicator on the machine to indicate when data signals are being played back from the tape.

7. The beep frequency at the end of the outgoing announcement message may be changed to the modem carrier frequency. In this way, if a caller has a modem which does not output a carrier until it receives an answer carrier from the answering end, the modem will seize on such a carrier when the beep is played back.

The advantages of the system of the invention are as follows: currently, if a person wants to record data and voice, he must have two telephone lines, one line to be connected to the answering machine and the other to be connected to an auto answer modem connected to the computer. A caller must call the first line to leave a voice message, and the caller must then call on the second line to leave the data message. The two systems, namely the answering machine and the modem, cannot be hooked in parallel to a single telephone line, because as soon as one system answers the telephone line it stops ringing. Since the other system does not get any more ring signals, it never answers the call.

With the system of the present invention, only one telephone line is needed to record both data and voice signals. With the apparatus of the present invention, when a person wants to leave a voice and data message, he need make only one telephone call and he may then leave any number of voice or data messages in any sequences during the same call.

It will be appreciated, that while a particular embodiment of the invention has been shown and described, modifications may be made. It is intended in the claims to cover all modifications which come within the true spirit and scope of the invention.

We claim:

1. In combination: first means adapted to be coupled to a telephone line for recording both voice and data signals received over the telephone line, said first means including control circuitry for limiting the recording of the voice signals to a time interval determined by the actual reception of voice signals, and said data signals being received over the telephone line modulated on a carrier; and second means adapted to be coupled to the telephone line for detecting the data signal carrier and connected to said first means to introduce a control signal to said first means to disable said control circuitry thereby to enable said first means to record the data signals for so long as data signals are received over the telephone line.

2. The combination defined in claim 1, in which said second means comprises a modem for demodulating the data signals and for detecting said carrier, and which includes a computer connected to said modem for utilizing the demodulated data signals from the modem.

3. The combination defined in claim 1, in which said first means comprises a telephone answering machine.

4. The combination defined in claim 1, in which said first means is adapted to receive and play back said voice and data signals.

* * * * *